United States Patent [19]
Napolitano

[11] Patent Number: 5,867,936
[45] Date of Patent: Feb. 9, 1999

[54] RESILIENT TREE GUY

[75] Inventor: Alex Napolitano, Whittier, Calif.

[73] Assignee: Wonder Tree Tie, Inc., Placentia, Calif.

[21] Appl. No.: 966,735

[22] Filed: Nov. 10, 1997

[51] Int. Cl.$^6$ .................................................. A01G 17/10
[52] U.S. Cl. .................................................................. 47/43
[58] Field of Search .............................. 47/40.5, 42, 43, 47/44; 247/523, 524, 529, 519

[56] References Cited

U.S. PATENT DOCUMENTS

| | | | |
|---|---|---|---|
| 3,861,629 | 1/1975 | Merrill | 47/40.5 |
| 4,190,983 | 3/1980 | Rostomily | 47/40.5 |
| 4,222,198 | 9/1980 | Napolitano et al. | 47/43 |
| 4,254,578 | 3/1981 | Hanfeld | 47/40.5 |
| 4,319,428 | 3/1982 | Fox | 47/42 |
| 4,649,666 | 3/1987 | Ness et al. | 47/43 |

*Primary Examiner*—Thomas B. Will
*Assistant Examiner*—Robert Pezzuto
*Attorney, Agent, or Firm*—Allen A. Dicke, Jr.

[57] ABSTRACT

The tree guy includes a loop of resilient tubular synthetic polymer composition material which engages around the tree trunk. Separate tension members engage in the two ends of the loop and extend from loop end closures into tubular legs which extend toward the ground at which they are anchored. The legs preferably have compression springs therein and tension members connect the compression springs with the loop so that when the legs are anchored, springs are deflected to provide support to the tree. In a similar tree tie tension members can be attached to a support post while the loop engages around the tree. The loop contains separate compression springs.

18 Claims, 3 Drawing Sheets

RESILIENT TREE GUY

FIELD OF THE INVENTION

This invention is directed to a guy for supporting newly planted trees, and particularly resilient tree guys which extend between the tree and an anchor in the ground.

BACKGROUND OF THE INVENTION

In the planting and growing of live trees it is often required and it is common practice to support trees to prevent them from being blown over. This support is necessary until roots are well established in the surrounding ground and the trunk has grown to sufficient size to provide adequate support for the tree top when winds may cause damage. Supporting the tree is also utilized for control of the direction of growth. There are two common ways in which tree support is attained. One is to set several upright support posts in the ground on opposite sides of the tree, or on the windward side of the tree and to tie the tree to the posts. Such a system can generally be called a tree tie. Another system comprises the burying of anchors around the newly planted tree and tying the tree to these anchors. The usual structure employs a flexible hose around the tree trunk and a wire loop through the hose. The wire is attached to the anchor. The hose prevents the wires from coming into contact with and cutting into the tree trunk. The hose is sufficiently large and sufficiently soft and flexible so that the force applied by the tree tie to the tree is effectively distributed so as to prevent localized damage to the tree trunk. In order to prevent tree ties and tree guys from strangling or otherwise adversely affecting the growth of the supported trees, it is common and recommended practice to retie the tree at least once a year. In doing so, the ties are lengthened so as to allow for anticipated growth. Such attention to each tree guy and tree tie requires a great deal of time. However, if lengthening of the tree ties and guys is not accomplished, tree damage may result. It is desirable to create an improved resilient tree guy which overcomes the problems of regular tree guy adjustment.

SUMMARY OF THE INVENTION

In order to aid in the understanding of this invention, it can be stated in essentially summary form that it is directed to a resilient tree guy which comprises a tree loop which is sized and of such flexibility as to engage a tree trunk without localized pressure damage thereto. First and second tension members are secured into the tree loop. These tension members are engaged in first and second legs which contain first and second springs. The first and second legs are configured for connection to separate tree anchors.

It is thus a purpose and advantage of this invention to provide a resilient tree guy structure which permits resilient support of a tree from anchors positioned in the ground around the tree.

It is a further purpose and advantage of this invention to provide a resilient tree guy which includes a tree loop for engagement around the trunk of a tree with distribution of force against the tree. First and second tension members are secured to the tree loop and are resiliently connectable to anchors around the tree so that the tree loop is resiliently anchored.

It is a further purpose and advantage of this invention to provide a resilient tree guy which securely supports a newly planted and/or growing tree with respect to anchors buried around the tree.

It is a further purpose and advantage of this invention to provide a resilient tree guy which permits tree growth and tree flexure within a limited amount.

It is a further purpose and advantage of this invention to provide a resilient tree guy which can be easily installed and which can reliably support the tree, including flexure of the tree during growth or as a result of wind.

Other purposes and advantages of this invention will become apparent from the study of the following portion of the specification, the claims and the attached drawings.

DESCRIPTION OF THE PREFERRED EMBODIMENTS

Figure 1:
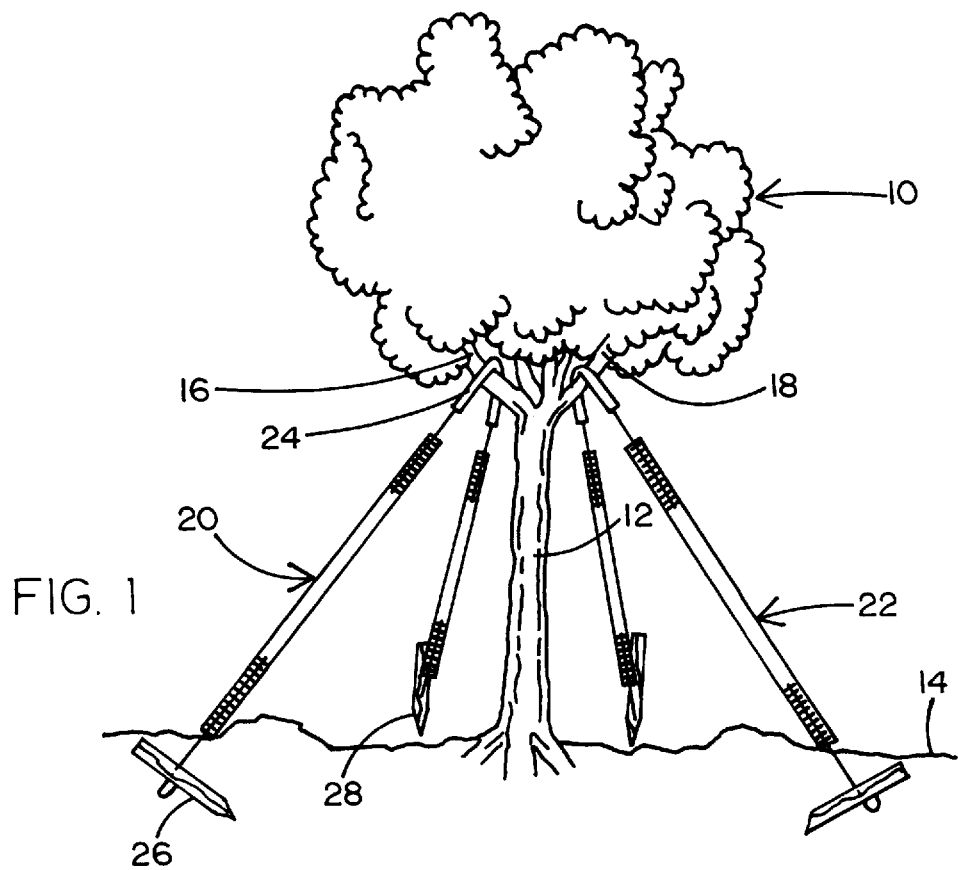
FIG. 1 is a side elevational view of a tree supported by the resilient tree guy of this invention.

FIG. 1 shows a tree 10 having a trunk 12. The roots on the trunk are planted in the ground 14. Most trees are nursery grown and are moved to a location where their mature growth is desired. In a nursery, the trees are pruned to produce branching at an appropriate height. Branches are seen at 16 and 18 in FIG. 1. Landscape architects conventionally determine tree size, tree placement and the specific manner in which trees are planted. The specifications for the planting of the tree often include guying of the tree to prevent the tree from being blown over in heavy winds. Two resilient tree guys are generally indicated at 20 and 22. Guy 20 is shown as having its tree engagement member in the form of loop 24 pass around branch 16. The lower ends of the tree guys are anchored. Anchors 26 and 28 are buried in the ground around the tree. Similarly, the loop of resilient tree guy 22 is engaged around the branch 18 and its anchors are also buried in the ground.

Figure 3:
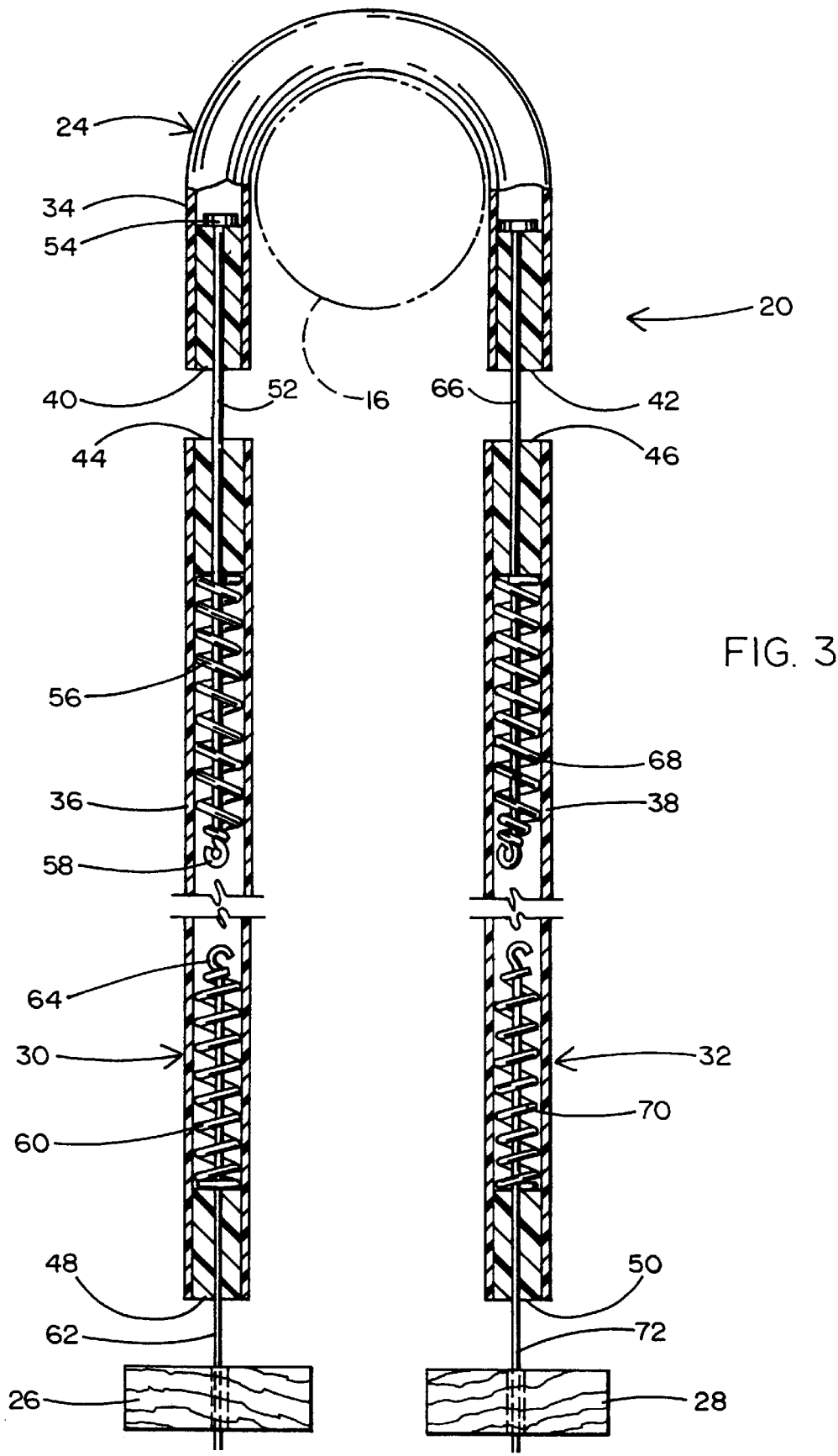
FIG. 3 is a plan view, with parts broken away and parts taken in section of the tree guy of FIG. 1.

The tree guy 20 is shown in more detail in FIG. 3. The tree guy 20 comprises three principle portions: The loop 24 and first and second legs 30 and 32. Flexible tubes 34, 36 and 38 comprise the principle portions of the loop and legs. The flexible tubes are preferably of the same material. At least the loop 24 is required to be sufficiently flexible to engage around the branch 16, and it is not undesirable for the legs to be of similar flexibility. Therefore, the tubes 34, 36 and 38 can be of the same material. They are preferably of ¾ inch outside diameter and ½ inch inside diameter and made of polyvinyl chloride or similar synthetic polymer composition material. The synthetic polymer preferably includes an anti-oxidation and anti-ultraviolet degradation material.

End closures in the form of plugs 40 and 42 are engaged in the ends of flexible tube 34 which forms the loop 24. Similar plugs 44 and 46 are positioned in the upper ends of tubes 36 and 38. Similar plugs 48 and 50 are secured in the lower end of tubes 36 and 38. Each of the plugs has a hole therethrough so that tension members can pass through the plugs. The plugs are secured by adhesive and may be supplemented by mechanical fastening.

Tension member 52 has a head 54 on the top of plug 40. The tension member is preferably a metallic wire or rod of about 3/16 inch steel wire material. The tension member 52 extends down into tube 36, through compression spring 56 and is terminated with head 58 below the spring. The head 58 may be a loop bent into the wire, with a washer between the loop and the spring.

The lower end of tube 36 has another compression spring 60 therein. The compression spring 60 is positioned on top of the plug 48. Tension member 62 extends through plug 48 and compression spring 60 to a head 64 above the spring. The head 64 may be a loop in the tension member 62. A washer would be appropriate between the head and the compression spring. The lower end of the tension member 62 is attached to the anchor 26 by any convenient means such as passing it through a hole in the anchor and/or wrapping around the anchor at an appropriate length.

The other side of the resilient tree guy 20 has the same structure. It has a tension member 66 engaged at the top on plug 42 and engaged at the bottom under compression spring 68. The lower end of the leg 32 and specifically the flexible tube 38 includes a compression spring 70 which is engaged between a head on the tension member 72. The tension member extends through plug 50 and is secured on the anchor 28.

After the tree is planted in the selected height and location, the loop of at least one resilient tree guy 20 is engaged around a tree limb or around the trunk above a tree limb. Unless the wind is expected to come from only one direction, two of the tree guys 20 are usually employed, as seen in FIG. 1. The loops thereof are appropriately engaged in the tree structure, holes for the anchors are excavated and the lower tension members are secured to the anchors. Thereupon, the anchors are buried with the tree tie under compression, with the compressions springs partly deflected. Should it become windy, the windward side would provide more supporting force, when the tree trunk is slightly deflected due to the action of the winds. In this way, tree guying is accomplished.

Figure 2:
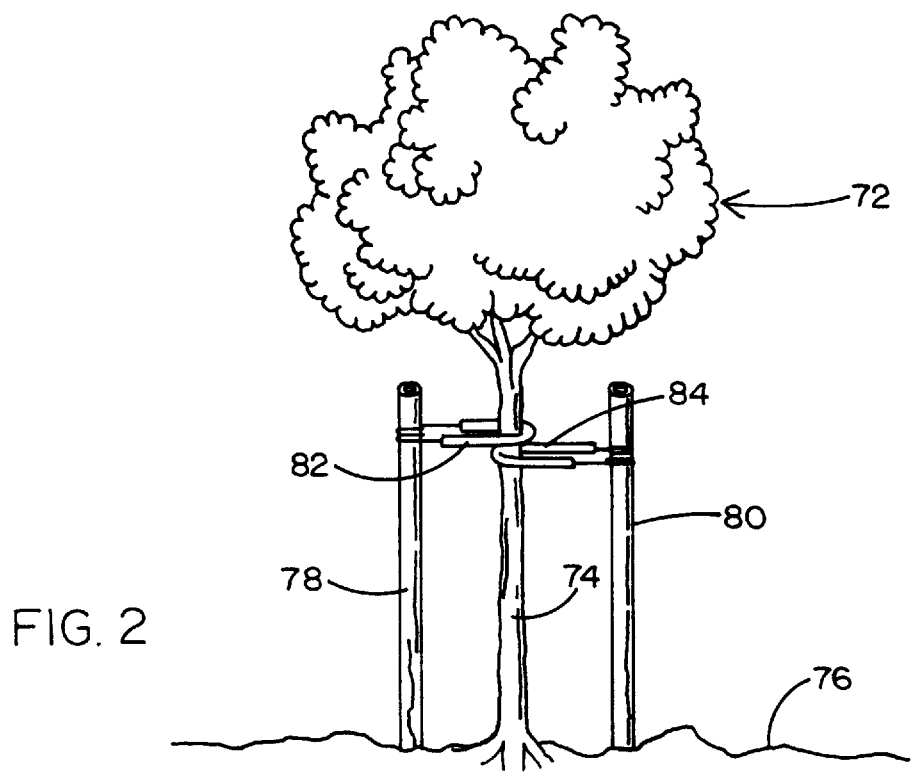
FIG. 2 is a side elevational view of a tree supported by a resilient tree tie in accordance with this invention.
Figure 4:
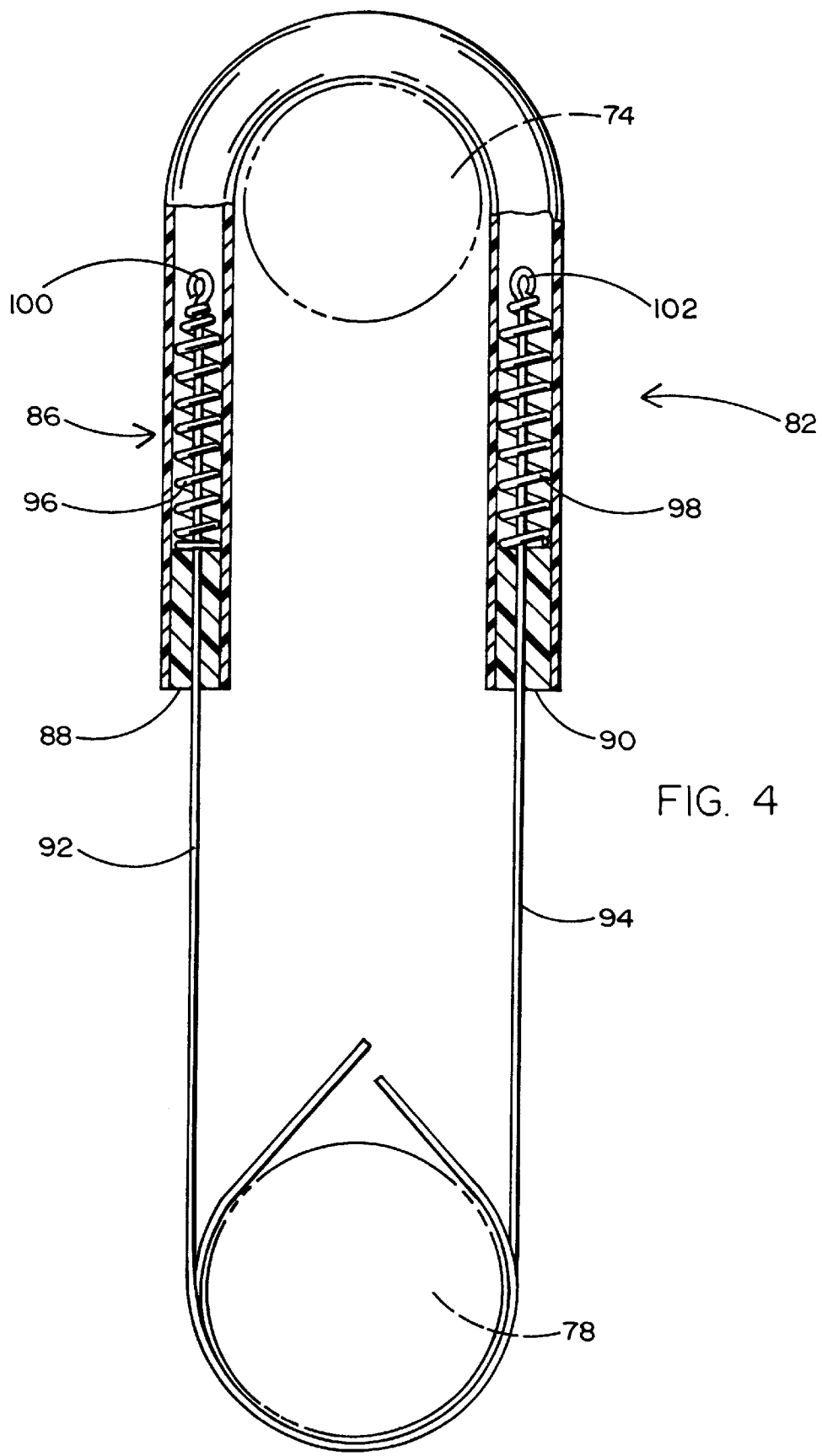
FIG. 4 is a plan view, with parts broken away and parts taken in section, of the tree tie of FIG. 2.

FIG. 2 shows a tree 72 with the roots on its trunk 74 planted in the ground 76. Instead of engaging anchors in the ground with resilient tree guys, supporting another anchor posts 78 and 80 are inserted into the ground on opposite sides of the tree trunk. Tree ties 82 and 84 engage around the trunk and around the support posts, respectively. The tree ties 82 and 84 are identical and tree tie 82 is shown in more detail in FIG. 4. Flex tube 86 is of the same character as flex tube 34. It has plugs 88 and 90 in its free ends. These plugs are secured in place by any convenient manner and have holes in the center thereof. Tension members 92 and 94 pass through the openings into the flexible tube. In the flexible tube and on top of the plugs are compression springs 96 and 98. The ends of the tension members on top of the compression springs carry heads 100 and 102 and may include washers between the heads and the springs. In use, the tree and the free ends of the tension members are pulled and secured around the support posts. Twisting of the wire tension members is a convenient way to make this attachment. The tubing, springs, plugs and tension members are of the same kinds of materials as those disclosed with respect to the tree guy 20. In use, one or more of the tree ties 82 is engaged around the trunk of the tree. The free ends of the tension members are pulled to a proper compression of the springs and the free ends are secured around the support posts. As illustrated in FIG. 2, two such tree ties are preferably employed.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A resilient tree support comprising:

an engagement member of tubular, flexible synthetic polymer composition material for engaging around a portion of a tree to be supported to form a loop, said engagement member having first and second ends;

first and second spring stops respectively secured to said engagement member at said first and second ends, said first and second stops each having an opening therethrough;

first and second separate tension members, each of said first and second tension members having a first end positioned within said engagement member and having a second end, each of said first and second tension members having a spring engagement head thereon;

means for anchoring said first and second tension members; and first and second separate compression springs positioned within said tubular engagement member, said first and second separate compression springs being respectively positioned between said heads on first and second tension members and said first and second spring stops so that said engagement member is resiliently mounted with respect to said means for anchoring said tension members.

2. The resilient tree support of claim 1 wherein said first and second spring stops are respectively first and second plugs within the first and second ends of said tubular engagement member.

3. The resilient tree support of claim 2 wherein said means for anchoring comprises said second end of said first and second tension members being configured to engage an anchor.

4. The resilient tree support of claim 1 wherein said means for anchoring comprises said second end of said first and second tension members being configured to engage an anchor.

5. A resilient tree support comprising:

an engagement member formed of flexible tubular material for forming a loop for engaging around a portion of a tree to be supported, said engagement member having first and second ends, first and second end closures respectively on said first and second ends, said end closures each having an opening therethrough;

first and second tension members extending through said openings in said end closures;

first and second tubular legs, each of said first and second legs being made of flexible tubular material and each of said first and second legs having first and second ends, each of said first and second ends of each of said first and second legs having a closure thereon with an opening through each said closure, said first and second tension members extending through said closures on said first ends of said first and second legs, respectively;

third and fourth tension members extending through said openings of said closures on said second end of said first and second legs, said third and fourth tension members having means thereon for anchoring said third and fourth tension members; and at least first and second compression springs respectively within said first and second legs, at least one of said tension members respectively engaging each said first and second compression spring to compress said springs when said tension members are tensioned.

6. The resilient tree support of claim 5 wherein said first and second compression springs are respectively in said first and second tubular legs and engaging against said closures on said first end of said tubular legs, said first and second compression springs being engaged by said first and second tension members so that tension in said first and second tension members respectively compress said first and second compression springs.

7. The resilient tree support of claim 6 wherein there are third and fourth compression springs respectively positioned within said first and second tubular legs, said third and fourth compression springs respectively being engaged by said third and fourth tension members so that tension therein causes compression of said springs.

8. The resilient tree support of claim 7 wherein said third and fourth tension members are separate from said first and second tension members.

9. The resilient tree support of claim 8 wherein said first and second tension members are separate from each other.

10. The resilient tree support of claim 5 wherein said first and second tension members are separate from each other.

11. The resilient tree support of claim 5 wherein said engagement member and said legs are made of flexible tubular synthetic polymer composition material.

12. The resilient tree support of claim 5 wherein said end closures of said tubular engagement member and said tubular legs comprise plugs within said tubular engagement member and said tubular legs.

13. The resilient tree support of claim 5 wherein said first and second tension members are separate from each other and spaced from each other along the length of said engagement member and said first and second tension members engage said first and second compression springs within said first and second legs, respectively.

14. The resilient tree support of claim 13 wherein there are third and fourth compression springs respectively in said first and second legs, said third and fourth tension members engaging said third and fourth compression springs, respectively, and said third and fourth tension members being separate from said first and second tension members.

15. The resilient tree support comprising:

a flexible tubular loop member having first and second ends, said loop member being sized to engage around a portion of a tree for supporting the tree, first and second plugs secured in said first and second ends of said loop member, said first and second plugs each having an opening therein;

first and second tension members in said loop member, said first and second tension members being separate from each other and respectively extending out of said first and second plugs;

first and second separate compression springs in said loop member, said first and second separate compression springs respectively engaging against said first and second plugs and said first and second tension members respectively engaging said first and second separate springs so that tension of said first and second tension members compresses said first and second separate springs; and means on said first and second tension members for attachment to a tree anchor.

16. The resilient tree support of claim 15 wherein each of said first and second tension members has a head thereon respectively engaging said first and second springs.

17. The resilient tree support of claim 16 wherein said loop member is made of flexible synthetic polymer composition material.

18. The resilient tree support of claim 16 wherein said means on said first and second tension members for attachment comprises sufficient length of said tension members to wrap around an anchor.

* * * * *